July 15, 1958   H. A. KAHLE   2,843,760
REACTIVE LOAD DIVISION CIRCUIT FOR PARALLEL GENERATOR SYSTEMS
Filed March 29, 1956
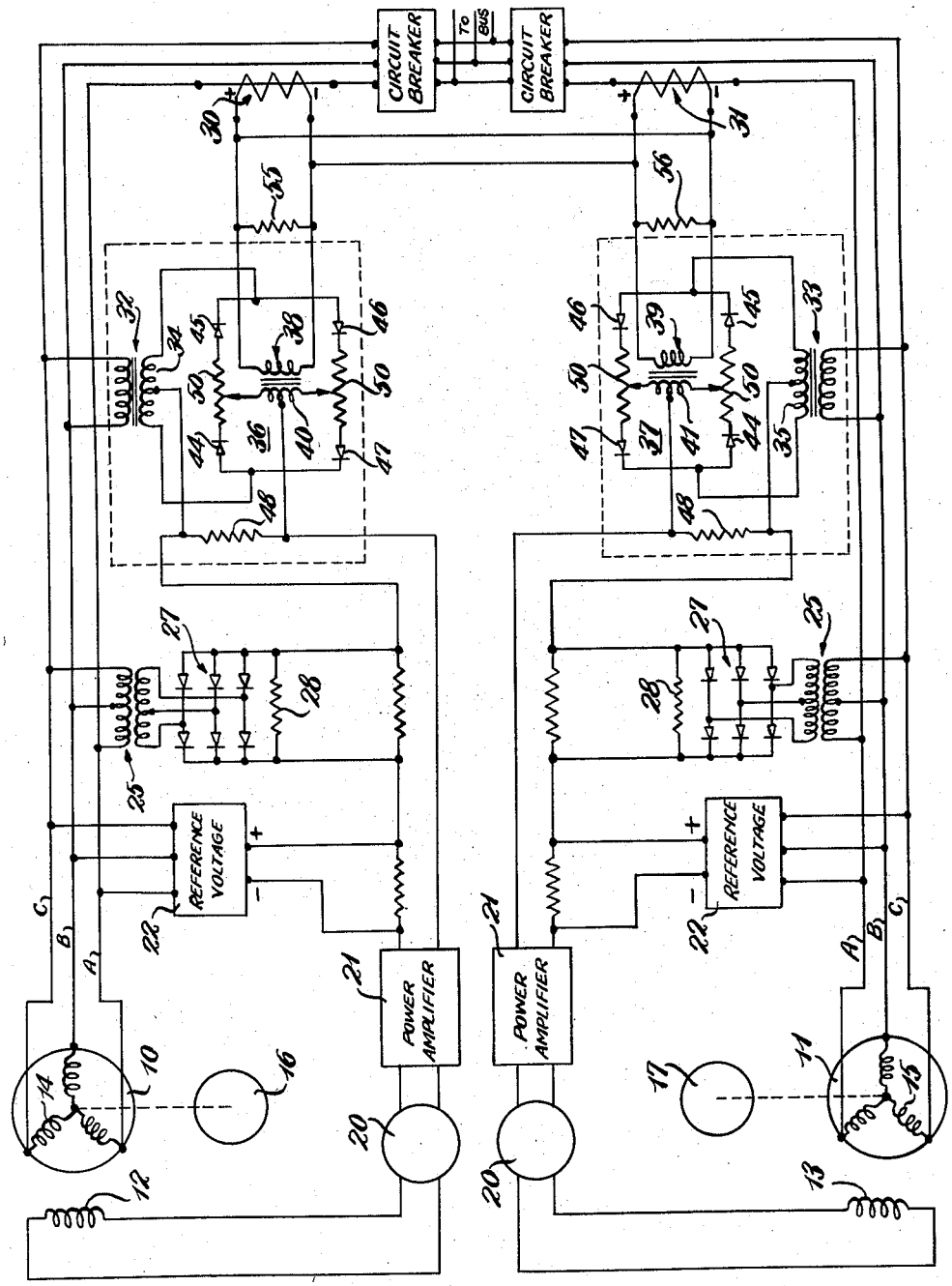
INVENTOR.
HERMANN A. KAHLE
BY
ATTORNEY United States Patent Office 2,843,760
Patented July 15, 1958

2,843,760

REACTIVE LOAD DIVISION CIRCUIT FOR PARALLEL GENERATOR SYSTEMS

Hermann A. Kahle, Bedford, Ohio, assignor to Jack & Heintz, Inc., Cleveland, Ohio, a corporation of Delaware Application March 29, 1956, Serial No. 574,823

6 Claims. (Cl. 307—57)

The present invention relates to generator systems and more particularly to systems having alternating current generators connected in parallel and regulating means for dividing the load, especially the reactive load, between the generators.

The principal object of the present invention is to provide, in a generator system having generators operating in parallel, new and improved, simplified regulating means for the generators wherein load division between the generators is accomplished by respective phase sensitive rectifiers having direct current outputs for controlling the generators which are substantially proportional to the difference between the reactive or active component of the line current of the corresponding generator and the average of all generator line currents of the paralleled system.

Another object of the present invention is to provide a new and improved regulating system for controlling the reactive or real load of three phase generators in parallel in which system the number of transformers is held to a minimum and a simple phase sensitive rectifying bridge is utilized to obtain a direct current signal indicative of the reactive or real load unbalance.

The present invention provides in a three phase alternating current generating system having a plurality of synchronous generators connected in parallel, a phase sensitive rectifier for each generator having, when the reactive load is to be regulated, a first input voltage derived from the current flowing in one phase and a second input voltage derived from the line to line voltage of the generator which is 90° out of phase with the line to neutral voltage of the phase from which the first input voltage is derived, the circuits for deriving the first input voltages of the rectifiers being interconnected so that there is only a signal voltage when an unbalance occurs between the line current of one generator and the average of all the line currents, and means connecting the output of each phase sensitive rectifier into the regulating means for controlling the excitation of the corresponding generator. When real load is to be controlled the second-mentioned voltage input to the phase sensitive rectifier is derived from the line to neutral voltage of the phase from which the first voltage input is derived and the output of the phase sensitive rectifier is used to control the power input to the prime mover for the corresponding generator.

The present invention resides in certain constructions and combinations and arrangement of parts and further objects and advantages thereof will be apparent from the following description of the preferred embodiment made with reference to the accompanying drawing which is a schematic electrical diagram of two three-phase generators connected in parallel and having regulating means in accordance with the present invention.

Referring to the drawings, the generating system shown therein includes three-phase synchronous generators 10, 11 which have their outputs connected in parallel, the phases of each generator being designated by the reference characters A, B and C, respectively. The generators 10, 11 have exciting field coils 12, 13 respectively, as well as armature phase coils 14, 15 respectively. Prime movers 16, 17 are provided for the generators 10, 11 respectively and the real output of the generators is controlled by controlling the power input from the prime movers to the generators. The output voltage and the reactive load of the generators are controlled by controlling the excitation or the field coils 12, 13.

The direct current field coils 12, 13 are each energized from a respective direct current exciter 20 which derives its power from a respective power amplifier 21 having its output connected to the respective exciter. The output of each power amplifier is controlled by a reference voltage, a direct current voltage proportional to the output of the respective generator, and a direct current voltage proportional to the unbalance in the reactive load system. The reference voltage and the voltage proportional to the voltage output of the particular generator are connected to the input of the corresponding power amplifier in opposition to each other.

The reference voltage for each generator is supplied by a respective constant voltage source 22 energized from the output of the corresponding generator. The details of the constant voltage sources suitable for use with the present invention are known to those skilled in the art and therefore the reference voltage sources will not be described in detail.

A direct current voltage input for each power amplifier proportional to the voltage output of the corresponding generator is obtained by rectifying the output of the corresponding generator. To this end, a three-phase transformer 25 for each generator is provided and the primary of each transformer 25 is connected to the output of the corresponding generator while the secondary of each transformer 25 is connected to a respective three-phase rectifier bridge 27. The output of each rectifier bridge is applied to a corresponding resistor 28 and the voltage drop across each resistor 28 is connected to the input of the power amplifier corresponding to the particular generator so as to oppose the reference voltage from the corresponding reference voltage source 22. As the output voltage of the generators increases, the resultant voltage applied to the input of power amplifier 21 will decrease causing the excitation of the generators to decrease.

In the illustrated embodiment a direct current signal proportional to reactive load unbalance is also applied to the input of the power amplifiers 21 when the reactive load is unbalanced among the generators. To this end, current transformers 30, 31 are provided in the A phase lines and voltage transformers 32, 33 are provided which have their primaries connected between the B and C phase lines of generators 10, 11. The transformers 32, 33 have center-tapped secondaries 34, 35, respectively, connected to one input of phase sensitive rectifiers 36, 37 respectively, the outputs of which rectifiers depend upon the magnitude and phase relationship of two input voltages to the rectifiers.

The secondaries of current transformers 30, 31, each wound with respect to its primary to achieve a current polarity with respect to each other as indicated by the current polarity reference marks on the drawing, are interconnected in series with additive polarity, resistors 55 and 56 are connected to the secondaries of the current transformers 30 and 31, respectively, so that the voltages across resistors 55 and 56 buck each other. As a result, no voltage will exist across resistor 55 or resistor 56 unless an unbalance exists between the currents in the secondaries of the current transformers. Such an unbalance will be present when the load is unbalanced between the generators 10, 11. This voltage is then applied by means of transformers 38, 39 to the phase-sensitive rectifiers. The transformers 38, 39, respectively, have center-tapped secondary coils 40, 41. When the two voltage inputs of the phase sensitive rectifiers 36, 37 are 90° out of phase, the rectifiers have no output voltage and when the voltage inputs to the rectifiers are in phase the voltage outputs of the rectifiers 36, 37 have a maximum output.

The secondaries of current transformers 30, 31 are inter-connected so that no input voltage from the current transformers will be applied to the phase sensitive rectifiers unless an unbalance exists between the currents in the secondaries of the current transformers.

Each of the phase sensitive rectifiers 36, 37 is of the same construction in the illustrated embodiment, and therefore only the phase sensitive rectifier 36 will be described in detail. The phase sensitive rectifier 36 includes a rectifier bridge 43 having individual rectifying elements 44, 45, 46, 47 in the respective legs thereof. The cathode of each rectifier element is connected to the anode of the following rectifier element when proceeding in one direction around the bridge. The voltage $E_1$ secondary coil 34 of the transformer 32 is connected across one diagonal of the rectifier bridge 43 while the voltage $E_2$ of the secondary coil 40 of transformer 38 is connected across the other bridge diagonal. The center-tapped connections of the secondary coils 34, 40 are connected together through a resistor 48 constituting the output resistor of the phase sensitive rectifier.

The voltage $E_1$ of the secondary of transformer 32 is higher than the output voltage $E_2$ of transformer 38 and when the voltage across the secondary of transformer 32 is in one direction current will flow through the rectifying elements on one side of the diagonal across which the coil 34 is connected and will be blocked from flowing in the other legs of the bridge by the rectifying elements on the other side of the bridge diagonal. When the voltage across the secondary coil 34 is in the opposite direction, the rectifying elements through which current had been flowing block the flow of current in the respective legs and the other elements which had been blocking current will now have current flowing therethrough. Therefore, the voltage $E_1$ from the secondary of transformer 32 will alternately open and then block the rectifying elements 44, 45 on one hand and rectifying elements 46, 47 on the other hand, the rectifying elements 44, 45 being blocked and the elements 46, 47 open when the voltage $E_1$ is in one direction and the elements 46, 47 being blocked and the elements 44, 45 open when the voltage $E_1$ is in the opposite direction.

The resultant current flowing through resistor 48 due to the secondary of transformer 32 is zero since the current from one half of the center-tapped secondary coil 34 flows in one direction through the resistor and the current through the resistor 48 from the other half of the coil is in the opposite direction. For example, if the voltage $E_1$ is such that the rectifying elements 44, 45 are conductive, current due to the half of the secondary coil at the positive end of the coil 34 will flow from the positive end of the secondary coil 34 through the rectifying element 44 and one half of the secondary coil 40 to the resistor 48 and back to the center tap connection of the secondary coil 34, while current from the other half of the secondary coil will flow from the center tap connection through the resistor 48 to the center tap of the secondary coil 40 of transformer 38 and then back to the secondary coil 34 through the rectifying element 45.

In the absence of the voltage $E_1$, the currents in resistor 48 due to the two halves of secondary coil 40 of transformer 38 will also oppose and cancel each other in the manner described above with reference to transformer 32. For example, if the end of the secondary coil 40 connected to the anode of rectifying element 45 is positive, current will flow from the positive end of the secondary coil 40 through the element 45 and the resistor 48 and then back to the center tap connection of the secondary coil 40, and, due to the half of the secondary coil 40 on the negative end of the coil, current will also flow from the center tap connection through the resistor 48 and the center tap connection to secondary coil 34 and then back to the negative end of the secondary coil 40 through the rectifying element 46. However, since $E_1$ on the illustrated circuit renders rectifying element 46 non-conductive to $E_2$ when rectifying element 45 is conductive, and vice versa, only current from one-half of the secondary coil 40 will flow through the resistor 48, thereby producing an output voltage when a voltage $E_2$ appears as long as the voltage is not 90° out of phase with $E_1$.

It can be shown that if the voltage $E_2$ is in phase with the voltage $E_1$, the resultant voltage drop across resistor 48 will be in one direction and if of opposite phase the voltage drop will be in the other direction. The output E from the phase sensitive rectifier may be shown to be represented by the equation $E = KE_2 \cos X$ where X is the phase angle between $E_1$ and $E_2$. The reactive component, however, of the line current I can be represented by $KI \sin G$ where G is the load phase angle. Since I is proportional to $E_2$ the reactive component of the line current I may be said to be $KE_2 \sin G$. It can now be seen that by making X equal to 90° when G is zero and if G and X vary together, the output voltage E of the phase sensitive rectifier will be proportional to the reactive component of the load. This is done in phase sensitive rectifier 36 by taking $E_2$ from one phase and $E_1$ from the line to line voltage of the other two phases.

The phase sensitive rectifier 37 for the generator 11 functions in accordance with the description of the phase sensitive rectifier 36 to sense the reactive load component of the generator 11 and the description thereof will not be repeated.

Preferably the secondary coils 40, 41 of transformers 38, 39 are connected into the respective rectifier bridge by connecting each of the opposite ends of the coils to the movable tap of a voltage dividing resistor 50 connected with the adjacent legs of the bridge circuit thereby providing a zero adjustment for the phase sensitive rectifier.

In the parallel system shown, the secondaries of the current transformers 30, 31 are interconnected so that the voltages from the secondaries are 180° out of phase so that there are no resultant voltages across the resistors 55 and 56 connected across the secondaries unless there is unbalance in the voltages of the secondaries.

If the generator 10 starts to assume a greater share of the reactive load, the reactive component of the line current I for generator 10 will lag the line to neutral voltage of phase A by 90° and the line current for generator 11 will lead the line to neutral voltage of phase A by 90°. Since the voltages of the secondaries are in opposition to each other, or 180° out of phase, a relative shift of 180° in the currents in the secondaries 40 will cause the current in the secondaries of 40, 41 to be in phase with each other and in phase or 180° out of phase with the corresponding voltage $E_1$. When the generator 10 assumes the greater share of the reactive load the voltage $E_2$ to bridge 36 is in phase with $E_1$ to the bridge 36 and the excitation of generator 10 is decreased while the voltage $E_2$ of the bridge 37 is out of phase with the voltage input $E_1$ and the output voltage drop across resistor 55 of the bridge 37 is of opposite polarity to that across the resistor 55 of bridge 36 and the output of the generator 11 is increased. If the opposite condition of unbalance occurs the resultant output from the secondary of current transformers 32 will shift 180° and the voltages across resistors 55, 56 at any given instant will be of opposite polarity to their polarity when transformer 31 has the greater output and the excitation of generator 11 will be decreased and that of generator 10 increased.

If the real load is to be controlled, the primaries of transformers 32, 33 are connected between the phase line containing the corresponding current transformers 30, 31 and the neutral of the generator. The output of the phase sensitive rectifiers will then be direct current signals which are proportional to the unbalance of the real load of the generators 10, 11 and can be used to control the prime mover for the generators 10, 11 to control the real load balance.

From the foregoing it can be seen that the present invention provides a new and improved simplified regulating system for paralleled generators, which system utilizes phase sensitive rectifiers to provide a direct current control signal for each generator for controlling the reactive or real load which is proportional to the difference between the line current of the particular generator and the average of the line currents of all the generators in the system.

While the preferred embodiment of the present invention has been described in considerable detail, further modifications and constructions and arrangements will be apparent to those skilled in the art and it is hereby my intention to cover all such modifications and constructions and arrangements which fall within the spirit and scope of the appended claims.

What I claim is:

1. In a generating system, first and second synchronous three-phase generators connected in parallel, individual regulating means for each generator responsive to a direct current control signal for controlling the excitation of each of the generators, a current transformer for each generator having its priimary connected in one of the output phases of the corresponding generator, a voltage transformer for each generator having its primary connected across the other two phases of the corresponding generator, phase sensitive rectifying means for each generator comparing the output of the corresponding current transformer and voltage transformer and for providing a direct current output signal dependent on the phase difference between the output of the current transformer and the voltage transformer and having a magnitude also dependent on the magnitude of the output from the current transformer, means connecting the output of each of said phase sensitive rectifying means to the corresponding regulating means, and means interconnecting the secondaries of said current transformer so as to provide a resultant output voltage therefrom only when the currents in the phases of the generator in which the current transformers are connected are unbalanced.

2. In a regulating system for paralleled three-phase synchronous generators, regulating means responsive to a direct current signal for regulating the load on a generator, first and second transformers connected to the output generator for providing first and second alternating voltage signals having a phase relationship indicative of the load on the generator, a rectifier bridge comprised of a plurality of rectifying elements each having its cathode connected to the anode of the following element when proceeding in one direction about the bridge, each of said transformers having center-tapped secondary coils, means connecting one of the secondary coils across one diagonal of said bridge, means connecting the other secondary coil across the other diagonal of the bridge, an output resistor connected between the center tap connections of said coils, and means for connecting the voltage drop across said resistor to the input of said regulating means.

3. In a regulating system for paralleled three-phase synchronous generators, regulating means responsive to a direct current signal input for controlling the excitation of a generator in parallel, a current transformer in one of the output phases of the generator for providing a first alternating current signal of a voltage dependent upon the line current of the generator, a first voltage transformer connected across the other two output phases of the generator, a second voltage transformer having its primary connected in series with the secondary of said current transformer, each of said voltage transformers having a center-tapped secondary coil, a rectifier bridge comprised of a plurality of rectifying elements each having its cathode connected to the anode of the following rectifying element when proceeding in one direction around the bridge, means connecting the secondary coils of said voltage transformers across different diagonals of said bridge, an output impedance connected between the center tap connections of the secondary coils of said voltage transformer, and means connecting the voltage drop across said output impedance to the input of said regulating means.

4. In a generator system, first and second three-phase synchronous generators having their outputs connected in parallel, regulating means for each generator responsive to a direct current input signal for controlling the load of the corresponding generator, a current transformer and a voltage transformer for each generator and connected to the output of the corresponding generator to provide first and second alternating current voltages having a phase relationship dependent on the load of the generator to be controlled, each of said voltage transformers having a center-tapped secondary coil, means interconnecting said current transformers so as to provide a first voltage only when the line current of one generator is different from the average line current, a rectifying bridge for each generator comprised of a plurality of rectifying elements each having its cathode connected to the anode of the following rectifier element when proceeding around the bridge in one direction, an input transformer for each bridge having its primary coil connected to said current transformers and a center-tapped secondary coil, means connecting the secondary coils of said input transformers across one diagonal of the corresponding bridge, means connecting the voltage outputs from the secondary coils of said voltage transformers across the other diagonal of the corresponding rectifier bridge, an output impedance for each bridge connected between the center tap connections of the secondary coils of the voltage transformers connected to the particular bridge, and means for connecting the voltage drop across each of said output impedances to the input of the respective regulating means.

5. In a generator system, first and second three-phase synchronous generators having their outputs connected in parallel, regulating means for each generator responsive to a direct current input signal for controlling the load of the corresponding generator, a current transformer connected into one phase of each generator to provide a first alternating current signal voltage, a voltage transformer for each generator and connected across the other two phases of the output of the corresponding generator to provide a second alternating current signal voltage for each generator having a phase relationship to the first signal voltage dependent on the reactive load of the generator, each of said voltage transformers having a center-tapped secondary coil, means interconnecting said current transformers so as to provide a first signal voltage only when the line current of one generator is different from the average line current, a rectifying bridge for each generator comprised of a plurality of rectifying elements each having its cathode connected to the anode of the following rectifier element when proceeding around the bridge in one direction, an input transformer for each bridge having its primary coil connected to the respective current transformer and a center-tapped secondary coil, means connecting the secondary coils of said input transformers across one diagonal of the corresponding bridge, means connecting the voltage outputs from the secondary coils of said voltage transformers across the other diagonals of the corresponding rectifier bridge, an output impedance for each bridge connected between the center tap connections of the secondary coils of the voltage and input transformers connected to the particular bridge, and means for connecting the voltage drop across said output impedance to the input of said regulating means.

6. In a generating system, first and second synchronous generators, individual regulating means for each generator responsive to a direct current input signal for controlling the operation of the generator, a current transformer for each generator having its primary connected in one of the output phases of the corresponding generator and a voltage transformer having its primary connected across two of the output phases of the corresponding generator for providing voltage signals having a phase relationship indicative of the load on the generator, circuit means interconnecting the secondaries of said current transformers so as to provide a resultant output voltage only when the currents in the output phases to which the primaries of the current transformers are connected differ, and a phase sensitive rectifying means for each of said generators for comparing the phase of the output voltage of the corresponding voltage transformer and the resultant output voltage of said current transformers and for providing a direct current control signal in response to a phase change between said voltages and having a magnitude also dependent on the magnitude of the resultant output voltage of said current transformers, and means connecting said direct current control signal to a regulating means of the corresponding generator.

References Cited in the file of this patent

UNITED STATES PATENTS 2,732,507     Stineman _____ Jan. 24, 1956